Patented June 9, 1936

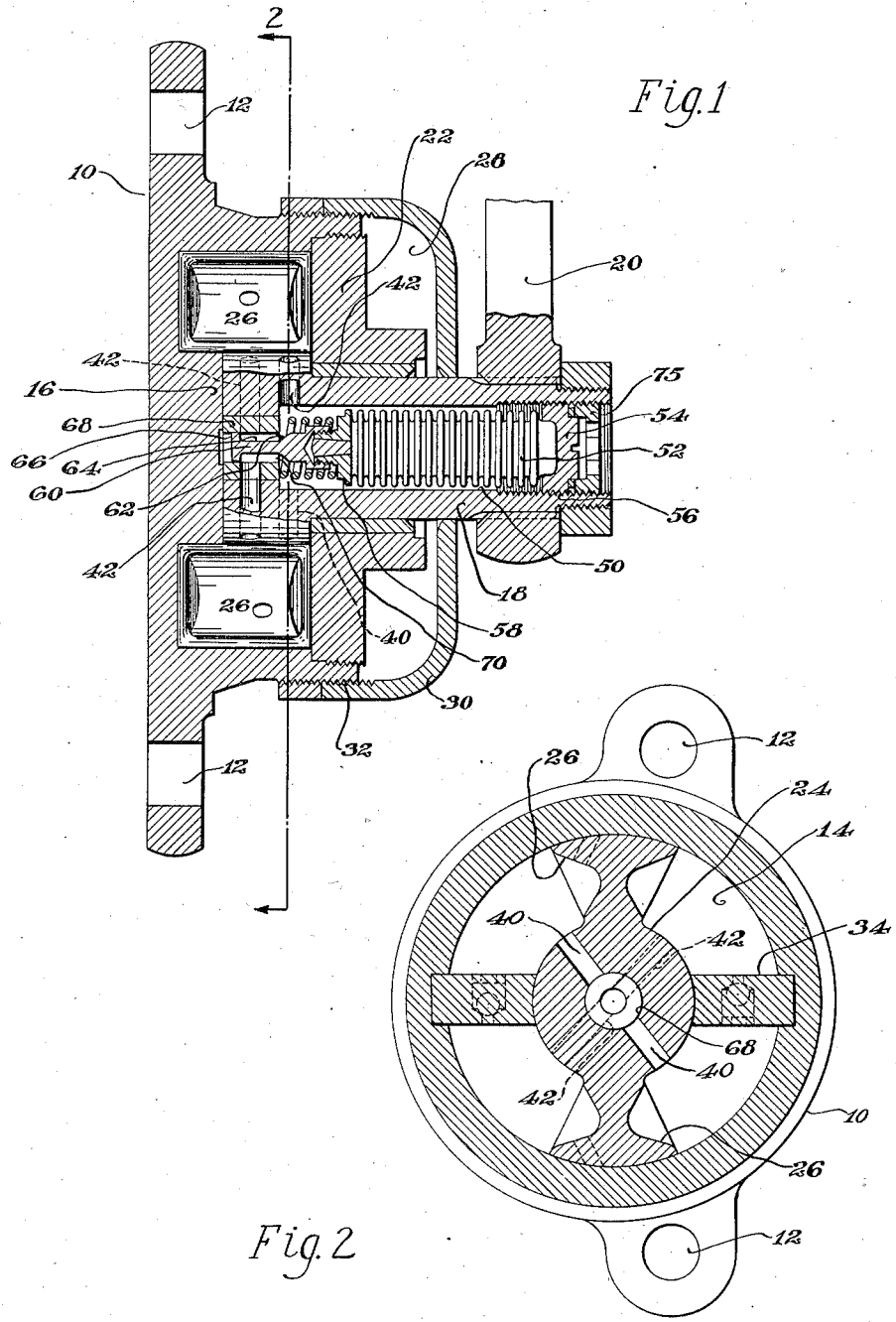

2,043,465

UNITED STATES PATENT OFFICE 2,043,465

FLUID TYPE SHOCK ABSORBER

Walter B. Clifford, Boston, Mass., assignor, by mesne assignments, to Houde Engineering Corporation, Buffalo, N. Y., a corporation of New York Application December 17, 1931, Serial No. 581,538

2 Claims. (Cl. 188—100)

The present invention relates to shock absorbers of the fluid type and particularly to such a shock absorber designed to present uniform and predictable fluid resistance irrespective of temperature variations.

The object of the invention is to produce a temperature controlled shock absorber of the fluid type which shall be capable of uniform operating characteristics, which is simple and rugged, and free from delicate or complicated parts affording liability for disarrangement or breaking.

With this and other objects in view, the various features of the invention consist in certain novel features of construction, combinations and arrangement of parts hereinafter described and claimed, the advantages of which will be obvious to those skilled in the art from the following description.

In the accompanying drawing illustrating the preferred form of the invention, Fig. 1 represents a sectional elevation of the invention embodied in the rotary type of shock absorber, and Fig. 2 is a section upon the line 2—2 of Fig. 1.

As indicated in the illustrated embodiment of the invention, the shock absorber is provided with a base portion 10 adapted for attachment to the vehicle frame through the bolt openings 12. This base portion is provided with a generally circular fluid chamber 14 and a centrally disposed hub 16. Extending inwardly of the base portion and journaled at its inner end upon the hub is a shaft 18 having the usual actuator arm 20 connected at its outer end. The shaft is also journaled in a cap 22 threaded in the base member, as indicated. The shaft 18 carries at its inner end a rotary piston 24 having opposing wings 26 which move within the cylindrical chamber, as will be evident. The fluid is replenished from a chamber 28 provided with an outer cap 30 threaded to the base at 32. Division internally of the fluid chamber is accomplished by a stationary partition 34 held at opposite ends in the wall of the base 10, as shown particularly in Fig. 2. With this construction, working movement of the rotary piston is resisted by fluid flow from one side of the piston to the other through passages 40 and 42 formed in the hub thereof. This construction, as generally described, is common to the type of instrument shown and is substantially identical with that illustrated in the patent to Houdaille, No. 933,076.

According to the present invention, the fluid flow through the passages 40 and 42 is metered accurately and in a manner to present a substantially unvarying resistance to fluid flow, regardless of changes in viscosity caused by temperature variation. This is accomplished by metering the orificial discharge in accordance with temperature variations, the metering device restricting the orificial opening or enlarging the orificial opening, according to a definite ratio calculated to present a uniform resistance. To this end, the shaft 18 is provided with a central bore 50 in which is located a metallic bellows 52 of small diameter. The bellows is anchored at its outer end in a cap 54 which in turn is threadedly engaged at 56 with the interior of the shaft, rotation of the cap through the threaded engagement serving to bodily adjust the bellows lengthwise of the shaft. The opposite end of the metallic bellows is provided with a head 58 to which is connected a metering plunger 60. This metering plunger is provided with a curved metering surface 62 terminating in a reduced neck 64 having at the outer end an enlarged guide 66 which slides within a sleeve 68 affording communication between the ports 40 and 42. The tapered surface 62 upon the metering plunger as it approaches toward or recedes from the orificial opening 70 at the entrance to the sleeve, accurately meters fluid flow and restricts the flow as the temperature rises to present a substantially constant resistance in accordance with the curve of viscosity change with temperature, the contour of the face 62 being accurately designed for this purpose. Obviously, this contour might be altered for fluid of different viscosity or different characteristics. The bellows thermostat 52 is filled with a liquid as, for example, glycerine and relies for its compensating movement upon the expansion and contraction of the liquid in a manner which will be familiar to those skilled in the art. At low temperatures, the contraction of the bellows completely removes the tapered surface 62 from the orificial opening to permit substantially unrestricted flow through the ports. As the temperature increases, however, the contour or surface is caused to gradually approach the port, metering the flow in accordance with the lessened viscosity until at temperatures on the order of 90 to 100° F. or above, the orificial opening may be substantially closed and thereafter further continued rise of temperature, if it occurs, merely serves to thrust the plunger further within the sleeve 68 without altering the restriction of the instrument.

Obviously, the operation and control may be varied as desired, by bodily adjustment of the bellows thermostat and connected metering device. With many fluids, it has been found in this type of instrument that at high temperatures, there is sufficient leakage by the pistons to make any venting of fluid thereabout undesirable. Accordingly, with such fluid, it is possible to so adjust the metering device that at such temperatures, the orificial opening is completely closed or substantially so. The provision of an instrument in which proper restriction may be obtained at working temperatures where substantial closure of the venting port is necessary, requires provision for permitting further expansive movement of the bellows control, if temperature increases. With the present construction, upon such increase in temperature, the valve merely overtravels without injuring the assembly or making it necessary to provide a yielding anchorage for the thermostatic unit.

The bellows unit is liquidly filled and hermetically sealed under a vacuum. Therefore, return of the unit to contracted position, upon lowering of temperature, is accomplished by the vacuum pull within the bellows. To insure that there shall be no lag in this return movement, and that the bellows at all times shall assume a length determined by the length of the liquid column therein, a return spring 70 is enclosed in the space surrounding the plunger beyond the bellows and interposed between the free end of the bellows and a fixed portion of the instrument, this spring being of sufficient strength to cause the metallic bellows to contract and follow the liquid column instantly upon contraction of the latter. The outer end of the thermostatic unit is closed by a cap 75 which, upon removal, permits either an adjustment of the bellows unit and metering plunger or the complete removal and replacement of the unit, as may be desired.

What is claimed is:

1. In a thermostatically controlled valve mechanism for use in hydraulic shock absorbers comprising a valve chamber connected by ports with the high and low pressure chambers at opposite sides of the piston of a hydraulic shock absorber, a cylindrical valve slidable in said chamber and having intermediate its ends a circumferential channel of varying depth for spanning said ports for the variable flow of fluid from one port to the other, and means under control of the temperature of the liquid in said shock absorber for controlling the shift of said valve and thereby the location of said channel relative to said ports.

2. In a thermostatically controlled valve mechanism for use in hydraulic shock absorbers comprising a valve chamber connected by ports with the high and low pressure chambers at opposite sides of the piston of a hydraulic shock absorber, a cylindrical valve slidable in said chamber and having intermediate its ends a circumferential channel of varying depth for spanning said ports for the variable flow of fluid from one port to the other during operation of the shock absorber, a thermostat element responsive to the temperature of the liquid of said shock absorber to shift said valve in one direction, and yielding means for shifting said valve in the opposite direction.

WALTER B. CLIFFORD.